Jan. 5, 1971  W. H. SCHIESSER  3,551,953
TRANSFER PRESS
Filed Dec. 11, 1967  5 Sheets-Sheet 3
Fig.4  Fig.3
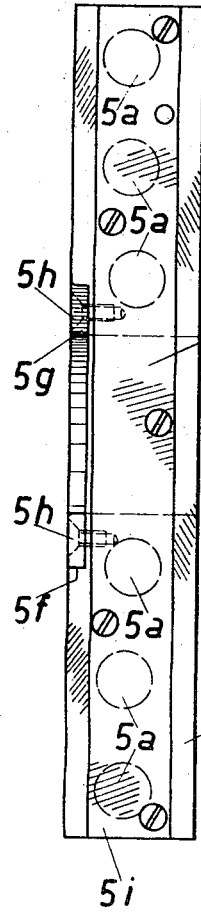
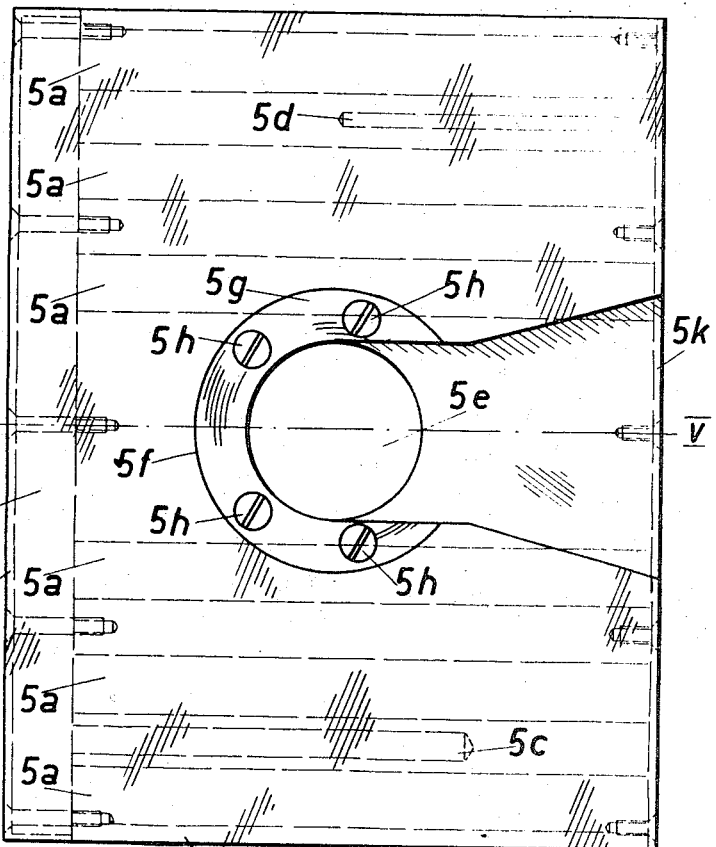
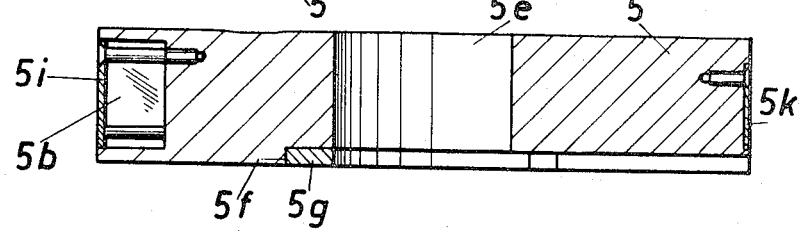
Fig.5
INVENTOR.
Walter Hugo Schiesser
BY Alvin Browdy
Attorney Fig.7 Fig.6
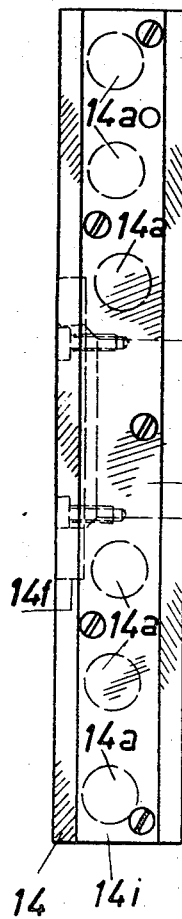
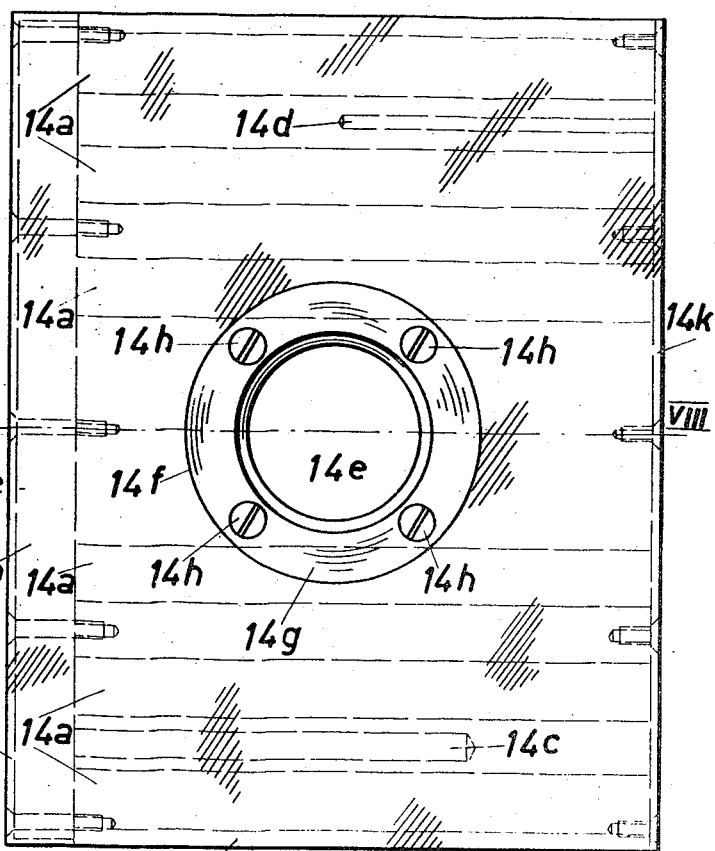
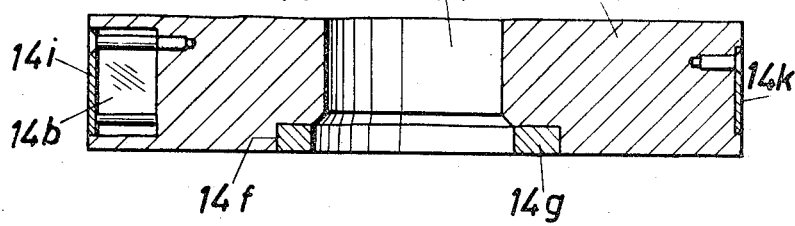
Fig.8

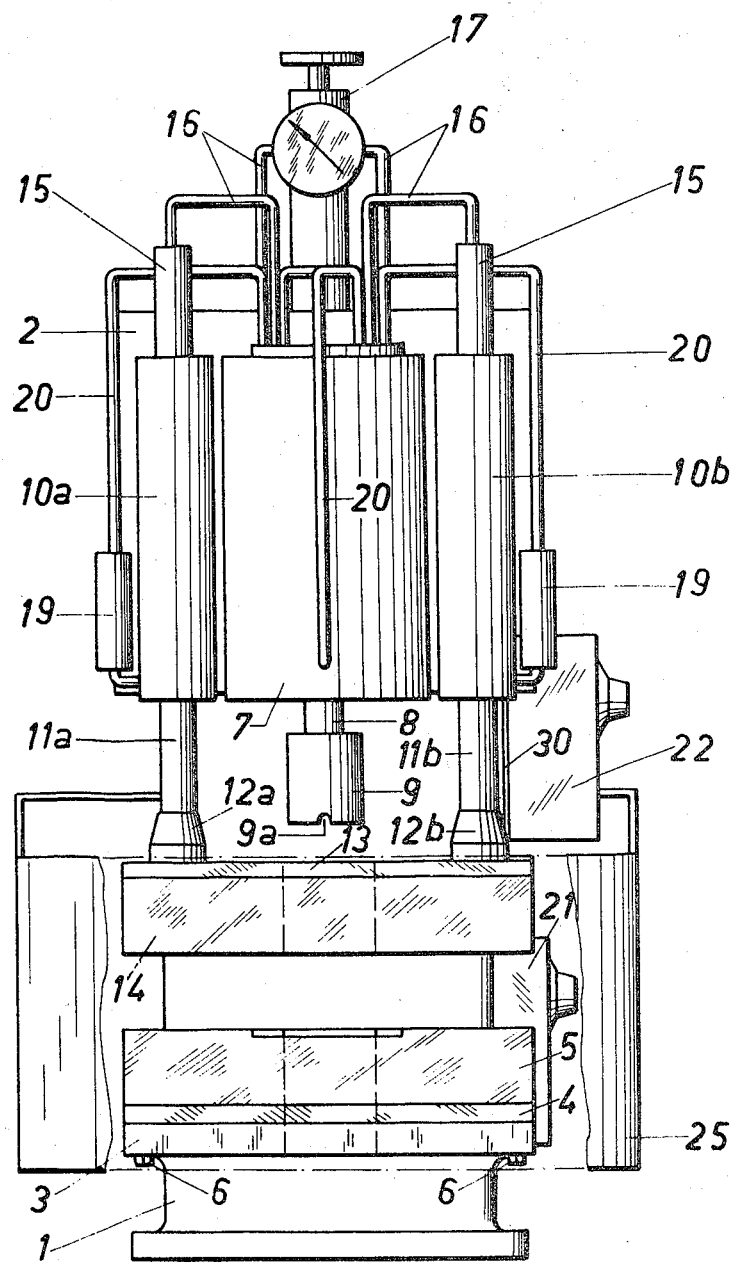

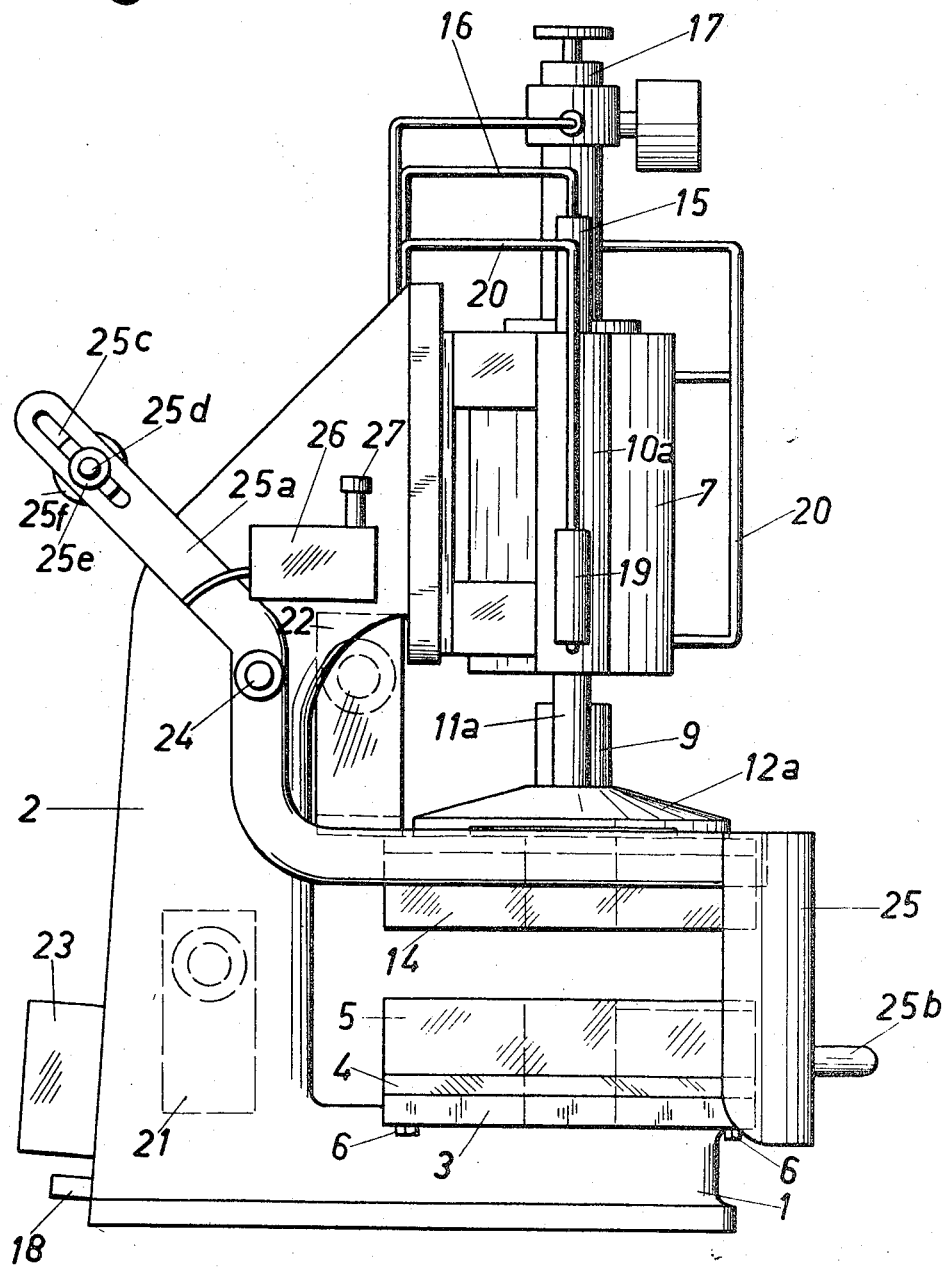

United States Patent Office 3,551,953
Patented Jan. 5, 1971

3,551,953
TRANSFER PRESS
Walter Hugo Schiesser, Hortensienstrasse 9,
Zurich, Switzerland
Filed Dec. 11, 1967, Ser. No. 689,382
Claims priority, application Switzerland, Dec. 17, 1966,
18,398/66
Int. Cl. B29h 5/00
U.S. Cl. 18—17                                        3 Claims

ABSTRACT OF THE DISCLOSURE

A transfer press provided with a replaceable mould comprising a top part and a bottom part, for the moulding and vulcanisation of rubber mouldings, in which the press is provided with a stationary lower hot plate resting on the pressing table, a vertically movable upper hot plate provided with a central cylindrical hole, and between the two hot plates the mould comprising a top mould part and a bottom mould part provided on its underside with a cylindrical lug, which lug is centered in a centering ring inserted in the top of the lower hot plate, two fixed vertical hydraulic cylinders, whose pistons are connected to the piston rods extending downwardly from the hydraulic cylinders, to the individual lower ends of which piston rods the upper hot plate is secured by means of a yoke, being mounted on the column of the press, a further fixed hydraulic cylinder to the piston rod of which, issuing downwardly therefrom, there is secured a press plunger which is adapted to be pressed into the press chamber containing the unvulcanised rubber mixture, and being also mounted on the column, the press chamber being formed by a cylindrical recess, provided in the top surface of the top mould part from which cylindrical recess at least one press duct extends into the moulding space of the mould, and by the bore of a fixed guide ring inserted in a recess provided in the top surface of the top mould part.

---

The invention relates to a transfer press with a replaceable mould comprising a bottom part and a top part for the moulding and vulcanisation of rubber mouldings.

By a transfer press is meant a press in which an unvulcanised rubber mixture is pressed from a press chamber through at least one press duct provided in one part, generally the top part, of a mould comprising one, two or more parts, into the moulding space of the mould and then vulcanised in the mould which is heated for this purpose. Any moulding, particularly angular and other moulded joints for joining vulcanised parts of a sealing frame and the like made of rubber may be produced and joined by vulcanisation to the vulcanised parts referred to, the ends at which the vulcanised parts are to be joined being inserted in the mould.

Thus, for example, transfer presses are known, in which the mould comprises a bottom mould part and a top mould part into the top face of which a cylindrical press chamber or several such press chambers is or are worked, at least one press duct extending from the individual press chamber or chambers into the moulding space in which the moulding is produced, the press being provided with a plunger or ram plate, to the underside of which one or more rams or plungers fitting into the press chamber or chambers provided in the top mould part is or are secured. In transfer presses of this kind, either the plunger plate of the pressing table are adapted to be vertically displaceable, and the plunger plate can be pressed downward against the press mould which, in this case, rests on the stationary pressing table, or the plunger plate, which in this case is stationary, may be pressed against the mould resting on the vertically displaceable pressing table, the plunger or plungers of the plunger plate penetrating into the press chamber or chambers thus forcing the unvulcanised rubber mixture introduced into the press chamber or chambers through the press duct or ducts into the moulding space of the mould. In transfer presses of this kind, the press mould has to be precision-centered on the pressing table, that is to say it has to be in alignment with the presser board, and has to be secured in that position. The operator has to carry out his work at a hot press which affords little accessibility. During this period, the press does not perform any productive work.

There are also known transfer presses which are provided with a hollow press plunger, by which the mould is first closed, and in which a second press plunger is guided by which the unvulcanised rubber mixture is pressed into the moulding space of a mould. The hollow press plunger, if desired together with a corresponding recess provided in the top side of the mould from which recess at least one press duct extends into the moulding space, then constitutes the space in which the unvulcanised rubber mixture to be moulded, is received. These transfer presses have the disadvantage of requiring a relatively large area for the moulding operation with resultant substantial waste of raw material, or an enormous force has to be applied to the internal press plunger with resultant high cost of the press.

In accordance with the invention, all of these disadvantages are avoided. The transfer press according to the invention, which is provided with a replaceable mould comprising a top part and a bottom part for the moulding and vulcanisation of rubber mouldings, affords a very simple and safe operation, extremely rational work, and a maximum rate of utilisation.

The invention relates to a transfer press provided with a replaceable mould comprising a top part and a bottom part for the moulding and vulcanisation of rubber mouldings.

In accordance with the invention, the transfer press is provided with a stationary lower hot plate resting on the pressing table, and vertically movable upper heating plate provided with a central cylindrical hole, the replaceable mould comprising a top mould part and a bottom mould part, on the underside of which a cylindrical lug held in a centred position in a centering ring inserted in the top side of the lower hot plate, being provided between the two hot plates. Mounted on the frame of the transfer press are two fixed hydraulic cylinders whose pistons are connected to piston rods issuing downwardly from the hydraulic cylinders, the two hot plates being secured by means of yokes to the respective lower ends of the piston rods. A third fixed vertical hydraulic cylinder is provided on the frame at a position between the aforementioned hydraulic cylinders, a press plunger, which may be pressed into the press chamber containing the unvulcanised rubber mixture, being secured to the downwardly issuing piston rod of the third hydraulic cylinder. The press chamber is formed by a cylindrical recess provided in the top side of the top mould part, from which recess at least one press duct extends into the moulding space of the mould, and by the bore of a fixed guide ring which is inserted in the recess provided in the top side of the top mould part.

By "rubber" is meant rubber of any kind, that is to say natural and synthetic rubber.

One construction of the transfer press according to the invention provided with a replaceable mould comprising a bottom part and a top part for the moulding and vulcanisation of rubber mouldings, the hot plate thereof, and one construction of mould are diagrammatically illustrated by way of example in the accompanying drawings, in which:

FIG. 1 is a front elevation of the transfer press;

FIG. 2 is a side elevation of the transfer press;

FIG. 3 is a plan view of the lower hot plate of the transfer press;

FIG. 4 is a front view of the lower hot plate;

FIG. 5 is a section on the line V—V of FIG. 3;

FIG. 6 is a view looking upwardly at the upper hot plate;

Figure 9:
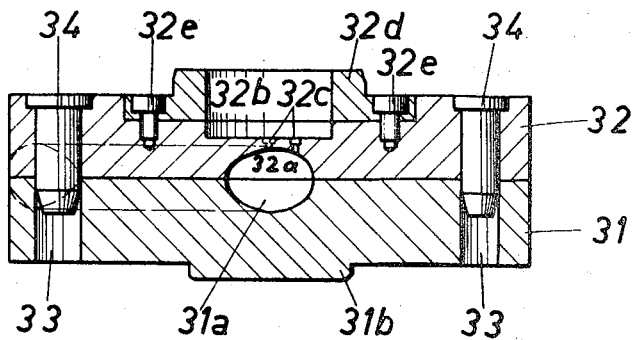
Figure 10:
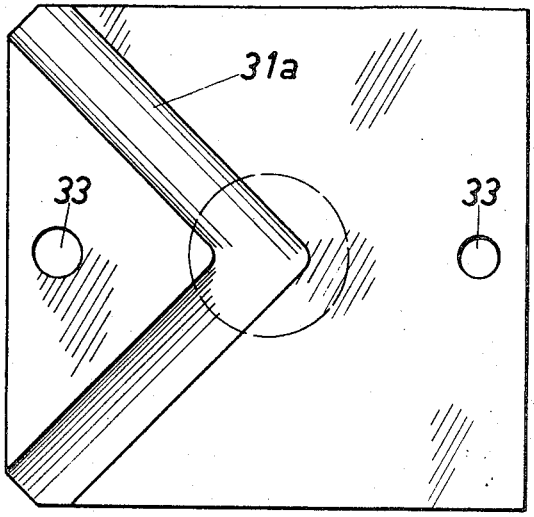

FIG. 7 as a front elevation of the upper hot plate;

FIG. 8 is a section on the line VIII—VIII in FIG. 6;

FIG. 9 shows by way of example a vertical section through one construction of mould for the transfer press;

FIG. 10 shows a plan view of the bottom part of the mould; and

Figure 11:
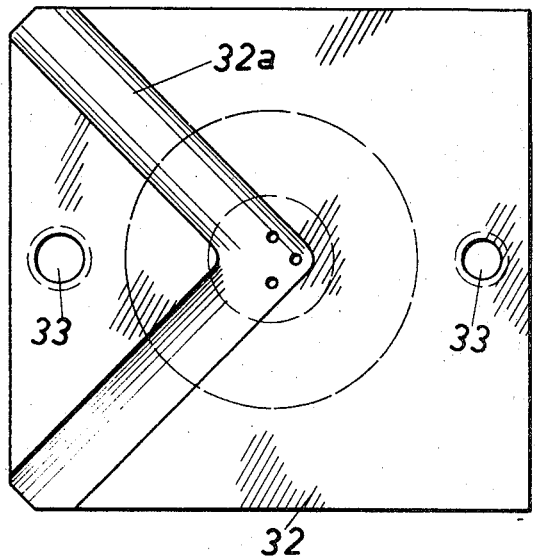

FIG. 11 is a view looking upwardly at the mould.

The transfer press illustrated in the drawings has a press frame comprising a base 1, a column 2 mounted on the rear part of the base 1 and projecting forwardly at the top, and a pressing table 3 provided on the forward part of the base 1. An insulating plate 4 rests on the pressing table 3, a lower hot plate 5, which is hereinafter described in detail, resting on the insulating plate 4. The insulating plate 4 and the lower hot plate 5 are secured by means of screws 6 to the table top 3. A vertical stationary double-acting hydraulic cylinder 7 disposed at a mid-position above the pressing table 3 is mounted on the forwardly projecting top part of the column 2. Guided in the hydraulic cylinder 7 is a piston having secured to it a piston rod 8 issuing downwardly from the hydraulic cylinder 7, a press plunger 9 being secured to the lower end of the piston rod 8. Provided on the top part of the column 2 to both sides of the hydraulic cylinder 7 are two further fixed vertical, double-acting hydraulic cylinders 10a and 10b, a piston being guided in each cylinder. Yokes 12a and 12b are respectively secured to the lower ends of the piston rods 11a and 11b issuing downwardly from the hydraulic cylinders 10a and 10b. Secured by means of screws to the yokes 12a and 12b is an insulating plate 13, an upper hot plate 14 (hereinafter described in detail) contacting the underside of the insulating plate 13 being secured thereto by means of screws. The hydraulic cylinders 7, 10a and 10b are connected to a hydraulic connecting pipe 18 by control valves 15, hydraulic conduits 26 and an indicating pressure-adjusting valve 17, and to a discharge pipe for the hydraulic medium by control valves 19 and hydraulic conduits 20. The hydraulic connecting pipe 18 and the hydraulic discharge pipe are respectively connected to the press and suction sides of a hydraulic pump, not shown. The transfer press illustrated in the drawing is provided with an automatic control device, not shown, the operation of which is hereinafter described. A thermostat 21 is provided for the lower hot plate 5, a thermostat 22 being provided for the upper hot plate 14, and a terminal box 3 for the electric heating of the hot plates 5 and 14. Mounted on each side of the column 2 on a shaft 24 provided in the column 2 are two lateral lever arms 25a of a hand guard 25 provided with a handle 25b. In the folded-down position, the hand guard 25 covers the upper lateral edge parts, and the front edge part of the insulating plate 13 and the front and forward side faces of the hot plates 5 and 14 and of the insulating plates 5 and 14, whereas in its folded-up position the hand guard affords access to the hot plates 5 and 14. Symmetrical slots 25c, in which an adjustable shaft 25d extending parallel to the shaft 24 may be clamped in position by clamping screws 25a are provided in the lever arms 25a of the hand guard 25, the rearwardly bent lever arms 25a being extended to a position beyond the shaft 24. A counter weight 25f for the hand guard 25 is mounted on the shaft 25d. One of the lever arms 25a serves to operate a starting switch 26 and a changeover switch 27, by means of which switches the control device of the transfer press is switched on or switched over as hereinafter described.

The lower hot plate 5 consists of a casting containing parallel continuous bores 5a extending from the front to the rear for insertion of electric heating rods (six in the illustrated construction) not shown in the drawings. The bores terminate forwardly in a groove 5b provided in the front side of the hot plate 5, the groove 5b containing the electric connecting lines for the electric heating rods. Furthermore, the hot plate contains a blind hole 5c in which the feeler of a thermostat 21 mounted on the column 2 may be inserted, and a further blind hole 5d for insertion of a thermometer. At a mid-position, the hot plate 5 is provided with a continuous circular hole 5e, its top side being provided with a recess 5f enclosing the hole 5e, the recess 5f widening symmetrically to both sides and extending to the front side of the hot plate 5. Inserted in the internal circular part of the recess 5f so as to be flush with the top surface of the hot plate 5 is a centering ring 5g which is secured to the hot plate 5 by means of screws 5h with sunk heads provided at intervals on the periphery of the centering ring 5g. The centering ring 5g is open in the direction of the forwardly extending widening of the recess 5f, so that the side faces bounding this widening extend into the centering ring 5g. A cover plate 5i covering the groove 5b is provided on the front side of the hot plate, a cover plate 5k covering the bores 5a being screwed to the back of the hot plate 5.

The upper hot plate 14 of similar construction to the lower hot plate 5 consists also of a casting, in which continuous parallel bores 14a extending from the front to the back for insertion of electric heating rods (six in the illustrated construction) are provided (not shown). The bores 14a open out forwardly into a groove 14b provided in the front side of the hot plate 14b, the grooves containing the connecting leads (not shown) for the electric heating rods. Also provided in the upper hot plate 14 are a blind hole 14c for insertion of the feeler of a thermostat 22 secured by means of a holder 30 to the column 2, and a blind hole 14d in which a thermometer may be inserted. At a mid-position, the hot plate 14 is provided with a continuous circular hole 14e, the plate 14 being provided on its underside with a recess 14f by which the hole 14e is enclosed. Inserted in the recess 14f is a closed centering ring 14b which, being flush with the underside of the hot plate 14, is secured to the hot plate 14 by means of screws 14h with sunk heads provided at intervals on the periphery of the centering ring 14b. A cover plate 14i covering the groove 14b is secured to the front side of the hot plate 14, a cover plate 14k covering the bores 14a being screwed to the back of the hot plate 14.

The hot plates 5 and 14 may be heated with superheated steam instead of being heated by means of electric heating rods.

The moulds used for the transfer presses hereinbefore described consist of a bottom part and a top part. One construction of mould of this kind used for the production of corner joints for joining the corners of sealing frames formed of strips of rubber is illustrated in FIGS. 9 to 11. Moulds of other constructions for producing other mouldings may be readily provided; the principle of the mould construction is, however, always the same, there being also no change in the pressing or moulding operation.

The mould illustrated in FIGS. 9 to 11 comprises a bottom mould part 31 and a top mould part 32, the two mould parts being held on upon the other in a centered position by centering bolts 34 inserted in matching holes 33, provided in the top mould part 32 and in the bottom mould part 31. Worked into the top surface of the bottom mould part 31 is the lower half 31a of the moulding space which, in the illustrated construction has a rectangular shape and an oval cross-section. At a mid-position on its underside the bottom mould part 31 is provided with a flat, cylindrical lug 31b which both with respect to its diameter and with respect to its height fits exactly into the centering ring 5b which is inserted in the circular inner part of the recess 5f provided in the lower hot plate 5. The top half 32a of the moulding space, which is symmetrical with the lower half 31a of the moulding space, is worked into the underside of the top mould part 32. A cylindrical recess 32b from which press ducts 32 extend into the angular part of the moulding space 31a, 32a, is provided in the top surface of the top mould 32. The cylindrical recess 32b is enclosed by a less deep recess, in which a flange of a guide ring 32d is inserted. The top surface of the flange of the guide ring 32d is flush with the top surface of the top mould part 32. The guide ring 32d is secured to the top mould part 32 by means of screws 32e with sunk heads provided at intervals on the periphery of the flange of the guide ring 32d. The bore of the guide ring 32d is flush with the recess 32b, its diameter corresponding exactly to the diameter of that recess. The bore of the guide ring 32d and the recess 32b together form the press chamber in which the raw, unvulcanized rubber mixture is received, the press plunger 9 fitting exactly into the press chamber. The part of the guide ring 32d that projects from the top surface of the top mould part 32 fits into the centering ring 14g of the upper hot plate 14, the upper edge of the guide ring 32d being provided with a border or flange.

The strips of rubber to be joined by the corner joint to be produced are inserted in the bottom half 31a of the moulding space in the lower mould part 31, so that they stop short of the corner of the half 31a of the moulding space. The top mould part 32 is then mounted on the bottom mould part 31 and is centered and secured in position by the centering bolts 33. The raw, unvulcanised rubber mixture is introduced into the press chamber formed by the guide ring 32d and by the recess 32b provided in the top surface of the top mould part 32. With the hand guard 25 in the folded-up position, the mould thus prepared is then introduced between the lower hot plate 5 and the upper hot plate 14 which is in its raised position, the recess 5f provided in the top surface of the lower hot plate 5 serving as the means by which the cylindrical lug 31b provided on the bottom mould part 31 is guided, so that the lug 31b provided on the bottom mould part 31 is inserted into the open centering ring 5g of the lower hot plate 5 and the mould is automatically moved to a position concentric with the axis of the press plunger 9. As the hand guard 25 is folded down upon introduction of the mould to this position, one of its lever arms 25a operates the starting switch 26 with the result that the supply of hydraulic medium to the pressure-adjusting valve 17 and thus to the hydraulic cylinders 7, 10a and 10b, is opened by a control device not shown in the drawings with resultant pressing. The control device has the effect that hydraulic medium is admitted first downwardly to the pistons of the hydraulic cylinders 10a and 10b, so that the upper hot plate 14 secured to the yokes 12a and 12b of the piston rods 11a and 11b is lowered, the centering ring 14g being thus pushed on to the projecting part of the guide ring 32d of the top mould part 32 with resultant slight adjustment and securing of the centering of the mould is necessary. The upper hot plate 14 is then pressed firmly on to the mould thus holding it securely in the closed position. It is only when this has taken place that the hydraulic medium is admitted downwardly to the piston of the hydraulic cylinder 7 with the result that the press plunger 9 moves downwards, enters into the press chamber formed by the bore of the guide ring 32d and the recess 32b provided in the top mould part 32, and presses the unvulcanised rubber mixture under a high pressure through the press ducts 32c into the moulding space 31a, 32a of the mould. The corner joint moulded from the rubber mixture pressed into the moulding chamber 31a, 32a is then vulcanised in the mould between the hot plates 5 and 14 which have been heated to a suitable temperature. During the period required for the vulcanisation, the transfer press requires no attention and the operator has thus time to prepare a second mould. Upon termination of the vulcanisation, the hand guard 25 is folded up and simultaneously one of its lever arms 25a operates the change-over switch 27 with the result that the direction of flow of the hydraulic medium is reversed. Hydraulic medium is thus admitted upwardly to the pistons of the hydraulic cylinders 7, 10a, and 10b which thus move upwardly, the piston of the hydraulic cylinder 7 preceding the pistons of the hydraulic cylinders 10a and 10b, so that the press plunger 9 is lifted from the guide ring 32d first. As it rises, the press plunger 9 entrains from the press chamber the residual material remaining therein after the pressing operation. The operation of the press plunger may be improved by providing a notch 9a in the underside of the press plunger 9, as illustrated in FIG. 1. The mould can then be withdrawn and replaced by another prepared mould. The mould may be provided with a handle to facilitate the manipulation thereof. The hand guard 25 may be folded up automatically and the folding-up operation may be controlled by an electric time- and/or temperature-controlled switch.

The replacement of the mould is extremely simple, requires little time and, since the operator is free to prepare another mould during the period required for the vulcanisation of the moulding, the inoperative time of the transfer press is limited to the minimum and a maximum degree of utilisation of the transfer press is ensured. The hand guard 25 prevents the occurrence of burns and injury to the hands due to the hands being trapped between the hot plates 5 and 14 and the mould, so that absolute safety of the operating personnel is ensured.

I claim:

1. A transfer press provided with a replaceable mould comprising a top part and a bottom part, for the moulding and vulcanisation of rubber mouldings, in which the press is provided with a stationary lower hot plate resting on the pressing table, a vertically movable upper hot plate provided with a central cylindrical hole, and between the two hot plates the mould comprising a top mould part and a bottom mould part provided on its underside with a cylindrical lug, which lug is centered in a centering ring in the top of the lower hot plate, means to press said mould parts together between said hot plates including two fixed vertical hydraulic cylinders whose pistons are connected to said upper hot plate said cylinders being mounted on the column of the press, means to press material to be moulded to the interior of said mould parts independent of and subsequent to said means to press said mould parts together including a further fixed hydraulic cylinder whose piston is secured to a press plunger which is adapted to be pressed into the press chamber containing the unvulcanised rubber mixture, said further cylinder being also mounted on the column, the press chamber being formed by a cylindrical recess provided in the top surface of the top mould part, from which cylindrical recess at least one press duct extends into the moulding space of the mould, and by the bore of a fixed guide ring inserted in a recess provided in the top surface of the top mould part.

2. A transfer press according to claim 1, which is provided with a control device which is switched on or switched over by a starting switch and a change-over switch, and a hand guard adapted to be folded up and down, said hand guard in its folded-down position covering at least the front faces of the hot plates and simultaneously closing the starting switch with resultant admission of hydraulic medium downwardly to the pistons of the hydraulic cylinders and, with time lag, to the piston of the further hydraulic cylinder, so that the upper hot plate may be lowered and the unvulcanised rubber mixture may be pressed into the moulding space of the mould, the hand guard in its folded-up position closing the change-over switch with resultant reversal of the direction of flow of the hydraulic medium and admission of the hydraulic medium upwardly to the piston of the hydraulic cylinder and, with time lag, to the pistons of the hydraulic cylinders also, for the purpose of lifting the press plunger from the press chamber and subsequent lifting of the upper hot plate.

3. A transfer press according to claim 1, in which the centering ring inserted in the recess provided in the top face of the lower hot plate is open in the direction of the front face of that hot plate, the opening of the centering ring being followed by the widening portion of a recess, in which the centering ring is received, said widening extending to the front face of the hot plate and widening symmetrically on both sides, the recess upon introduction of the mould serving as the means by which the lug provided on the underside of the bottom mould part is guided to its centered position in the centering ring.

References Cited

UNITED STATES PATENTS

| | | | |
|---|---|---|---|
| 1,993,942 | 3/1935 | Novotny | 18—30X |
| 2,389,169 | 11/1945 | Stacy | 18—30 |
| 2,412,671 | 12/1946 | Brunner | 18—30 |
| 2,463,401 | 3/1949 | Lyons | 18—30 |
| 2,900,663 | 8/1959 | Linhorst | 18—30X |

H. A. KILBY, JR., Primary Examiner

U.S. Cl. X.R.

18—30